United States Patent [19]

Dakin et al.

[11] Patent Number: 4,849,960
[45] Date of Patent: Jul. 18, 1989

[54] OPTICAL FIBRE TRANSDUCER INJECTED DATA TRANSMISSION SYSTEM

[75] Inventors: John P. Dakin; Christopher A. Wade; David J. Pratt, all of Hampshire, England

[73] Assignee: Plessey Overseas Limited, Ilford, England

[21] Appl. No.: 6,048

[22] Filed: Jan. 22, 1987

[30] Foreign Application Priority Data

Jan. 24, 1986 [GB] United Kingdom ............... 8601802
Nov. 5, 1986 [GB] United Kingdom ............... 8626420

[51] Int. Cl.[4] ............................................. H04B 9/00
[52] U.S. Cl. ........................................ 370/3; 455/610; 455/612; 455/616; 455/617
[58] Field of Search ............... 455/601, 606, 607, 610, 455/612, 616, 611, 617; 370/1, 3; 350/96.16

[56] References Cited

U.S. PATENT DOCUMENTS 4,294,513 10/1981 Nelson et al. ................. 455/612
4,630,889 12/1986 Hicks, Jr. ....................... 350/96.16

FOREIGN PATENT DOCUMENTS 2019561 10/1979 United Kingdom ............... 370/3
2165115 4/1986 United Kingdom ............... 455/610

*Primary Examiner*—Robert L. Griffin
*Assistant Examiner*—Leslie Van Beek
*Attorney, Agent, or Firm*—Fleit, Jacobson, Cohn, Price, Holman & Stern

[57] ABSTRACT

An optical transmission system comprises a plurality of transducers located at intervals along a continuous optical fibre data transmission path. Data signals are derived from respective transmitters associated with the transducers and are applied to the transducers to produce mechanical stressing or deformation of the data transmission path optical fibre for imparting corresponding modulation of the polarization state of light being propagated along the optical fibre. A receiver connected to the far end of the transmission path includes means for determining the exact state of polarization of the received light and for extracting the modulation information and hence transmitted data therefrom.

3 Claims, 3 Drawing Sheets

OPTICAL FIBRE TRANSDUCER INJECTED DATA TRANSMISSION SYSTEM

BACKGROUND OF THE INVENTION

This invention relates to optical transmission systems and relates more specifically to such systems in which data to be transmitted to a receiver over optical fibre means is effectively injected into the optical fibre means at a plurality of different data transmission points therealong in order to produce variations in the propagating light signal which can be analysed at the receiver for recovering said data.

SUMMARY OF THE INVENTION

According to the present invention there is provided an optical transmission system of the form just above described in which data signals derived from respective transmitters are applied to appertaining transducer means provided at intervals along a continuous length of optical fibre constituting a transmission path and effective to produce mechanical stressing or deformation of the optical fibre for imparting corresponding modulation of the polarization state of the light being propagated along the optical fibre and in which the receiver includes means for determining the exact state of polarisation of the received light and for extracting the modulation information and hence transmitted data therefrom.

In carrying out the present invention the data signals applied from the transmitters to the respective transducer means may comprise frequency, or amplitude modulated carrier signals having different carrier frequencies to facilitate ready filtering out of the different modulated signals at the receiver or may comprise pulsed signals having suitably timed periods of occurrence relative to other transmission points to allow time division multiplexing at the receiver.

To ensure that the polarization state of the plane polarized light propagating along the optical fibre (preferably so-called monomode fibre, which is reality will support two orthogonally-polarized modes with otherwise identical propagation characteristics) is effectively modulated by the fibre-straining or deforming action of the transducer means on the fibre, it is important that the stress applied to the fibre by the transducer means is not applied at 0° (i.e. parallel) or 90° (perpendicular) to the instantaneous plane of polarization of the propagating light at the position where the transducer means is attached to the optical fibre, otherwise the polarization state of the propagating light will not be modulated.

Since the state of polarization of the propagating light can vary with time and position along the fibre as a result of environmental effects, it is necessary to introduce into the transmission system arrangements for preventing the loss of information transfer over the transmission path due to the state of polarization of the propagating light varying so that it becomes parallel or perpendicular to the direction of stresses applied by the modulating transducer means.

A single transducer may be used at each of the data transmission points along a monomode optical fibre and modulation means may be provided in front of the first transmission data point along the transmission path to produce continuous modulation of the state of polarization of the plane-polarized light launched into the optical fibre transmission path whereby to ensure that transducers at the respective data transmission points fed with appropriately modulated carrier signals, perhaps at different frequencies from their appertaining transmitters, always induce state of polarization modulation during most of the modulation cycle. With single transducer arrangement according to the invention the state of polarization of the light in the optical fibre transmission path is changing continuously and consequently the direction of the stress imposed on the optical fibre by the transducers can never remain parallel or perpendicular to the plane of polarization of the propagating light thereby preventing modulation of the state of polarization of the latter. Thus modulation of the polarization state by the modulated carrier signals from the transmitters must occur at some point in the modulation cycle of the plane polarized propagating light signal.

BRIEF DESCRIPTION OF THE DRAWINGS

By way of example the present invention will now be described with reference to the accompanying drawings in which.

DETAILED DESCRIPTION OF THE INVENTION

Figure 1:
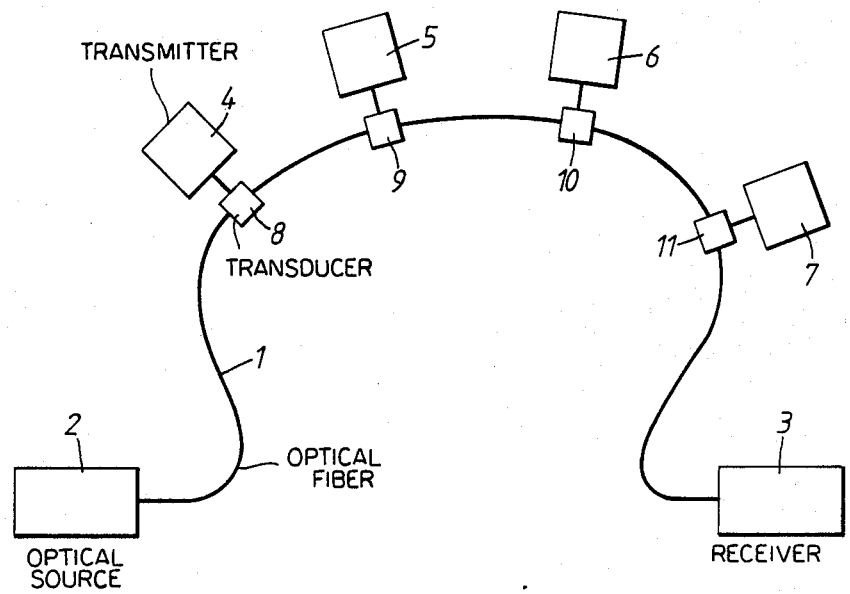
FIG. 1 is a schematic diagram of one optical transmission system according to the present invention.

Referring to FIG. 1, the optical transmission system depicted comprises a continuous monomode optical fibre 1 constituting an optical transmission line extending between an optical source 2 which produces plane polarized light for propagation along the optical fibre 1 and a receiver 3.

A plurality of transmitters such as transmitters 4, 5, 6 and 7 at remote transmitting stations are arranged to feed data signals, comprising modulated carrier frequency signals, to respective transducer means indicated at 8, 9, 10 and 11. The modulated signals from the respective transmitters will be at different carrier frequencies. The modulated data signals, which may be frequency-, pulse- or amplitude-modulated signals, are converted by the transducer means 8 to 11 into mechanical stress signals, which are applied by the transducer means to the optical fibre 1 at spaced points therealong. These mechanical stress signals cause the optical fibre 1 to be physically strained or deformed, thus varying the characteristic of the optical fibre at the points concerned in accordance with the modulated data signals produced by the transmitters 4 to 7. These variations in the characteristics of the optical fibre 1 produce modulation of the polarization state of the light propagating along the optical fibre 1. The state of polarization at the modulated polarized light arriving at the receiver 3 may be analysed, as, for example, by measuring the Stokes parameters which define the exact polarization state of the light propagating along the fibre 1, and the modulation information contained by the receiver input signal extracted by filtering to derive the data signals transmitted by the respective transmitters 4, 5, 6 and 7

It may here be mentioned that the radial angular directions in which stress is applied to the optical fibre 1 by the transducer means should not be 0° (i.e. parallel to the plane of polarization) or at 90° (i.e. perpendicular to the plane of polarization), otherwise the polarization state of the propagating light will not be modulated by the input to the transducer means. In order to avoid loss of data signals if the direction of the transducer applied stress becomes inadvertently parallel or perpendicular to the plane of polarization of the propagating light due to variations with time in the direction of the plane of polarization resulting from certain environmental conditions (e.g. lateral pressure from the fibre sheathing or cable assembly causing strain birefringence), various arrangements may be incorporated in the system of FIG. 1.

Figure 2:
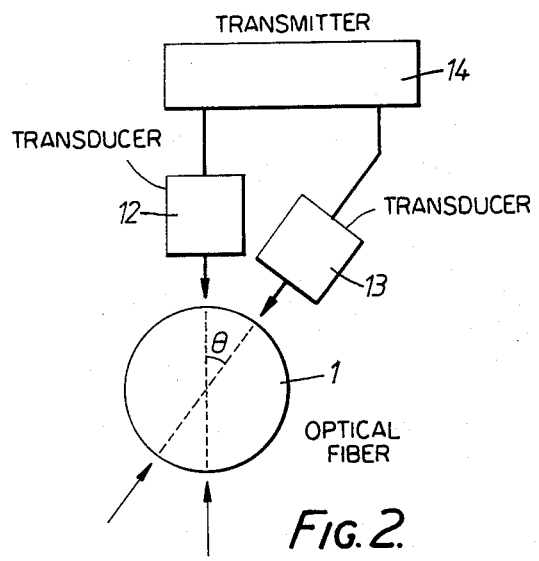
FIG. 2 is a diagram showing the operative positioning of the transducer means of FIG. 1 relative to the optical fibre transmission line.

Referring to FIG. 2 of the drawings, this shows an arrangement for avoiding the loss of signals just referred to. In the arrangement shown, each transducer means of FIG. 1 comprises two separate transducers 12 and 13 both of which are fed with modulated data signals from an apertaining transmitter 14. As can be appreciated from the drawing, the two transducers 12 and 13 are so orientated relative to the optical fibre 1 that there is an angle $\theta$ between them which is neither 0° nor 90°, and is preferably 45°. The modulated carrier signals applied to the transducers 12 and 13 have different carrier frequencies, but both are modulated by the same information to ensure that at least one carrier of the signal is effectively transmitted. Consequently, irrespective of the drifting of the plane of polarization of the propagating light the latter will always be modulated by the stress produced in the optical fibre 1 by at least one of the two modulating carrier signals. In this embodiment polarization analysis and filtering at the receiver will usually yield two signals (but one signal only if fading of one signal occurs due to unfavourable orientation of polarization) from each transmitting station.

In a modified form of the embodiment shown in FIG. 2, a single modulated carrier signal may be fed alternately to the two transducers 12 and 13. The frequency of alternation will generally be greater than the data rate but lower than the carrier frequency of the modulated signal. Bursts of stresses at carrier frequency will therefore be imposed alternately on the optical fibre 1 by the transducers 12 and 13. In most instances both transducers will modulate the polarization of the propagating light but in the event of unfavourable orientation of the plane of polarization relative to the directions of imposed stress only one of the transducers 12 and 13 will be effective. However, as long as the data rate is lower than the frequency of alternation of the signals fed to the two transducers the transmitted data can still be extracted in the receiver by filtering.

Figure 3:
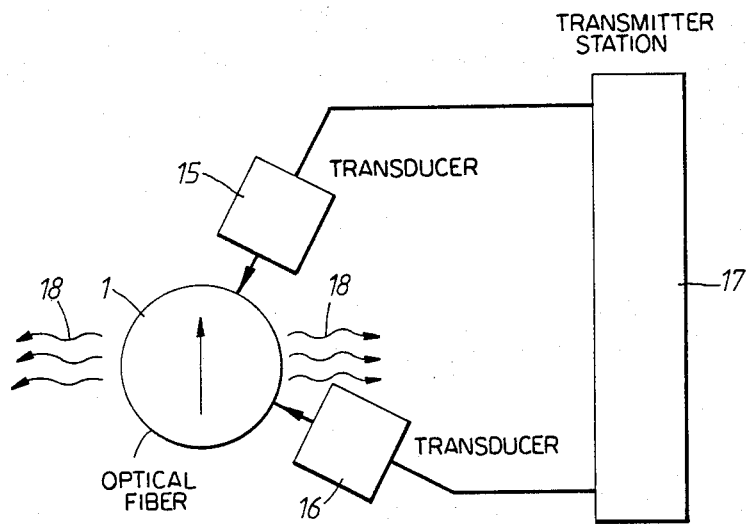
FIG. 3 is a diagram showing the operative positioning of the transducer means of FIG. 1 according to the direction of polarization of the propagating light in the optical fibre.

In another embodiment, illustrated in FIG. 3 of the drawings, two transducers, such as the transducers 15 and 16, are associated with the optical fibre 1 at each of the transmitting stations such as the station 17. These transducers are arranged to apply mechanical stresses to the optical fibre 1 in mutually perpendicular radial directions. The effective or resultant direction of the applied stress vector may however be set to any radial angle simply by adjusting the relative size and polarity of otherwise identical modulated signals (i.e. same carrier frequency) applied to the two transducers. This embodiment relies upon detecting the direction of polarization of light in the optical fibre 1 and then arranging the resultant strain-modulating signal to lie at 45° to the direction of polarization, in order to ensure high efficiency. To achieve this, use may be made of the non-isotropic nature of Rayleigh scattered light. This is a small amount of light that is normally scattered out of the optical fibre and has a maximum intensity perpendicular to the plane of polarization of light propagating in the optical fibre, as shown at 18 in FIG. 3. Hence, by detecting the angular distribution of the scattered light (in a plane perpendicular to the fibre axis) the direction of polarization can be derived and by adjusting the magnitudes and polarities of the modulated carrier signals applied to the transducers 15 and 16 the modulating stresses can be applied in the appropriate directions for maximum modulation of the state of polarization in the optical fibre. Loss of signals due to unfavourable location of the plane of polarization of the light relative to the applied stresses is therefore avoided.

In yet another embodiment of the invention the input state of polarization of the light launched into the optical fibre may be swept with time to permit intermittent but repetitively guaranteed polarization modulation at the transduction point. This embodiment enables a single transducer to be used at each of the data injection locations along the optical fibre.

Figure 4:
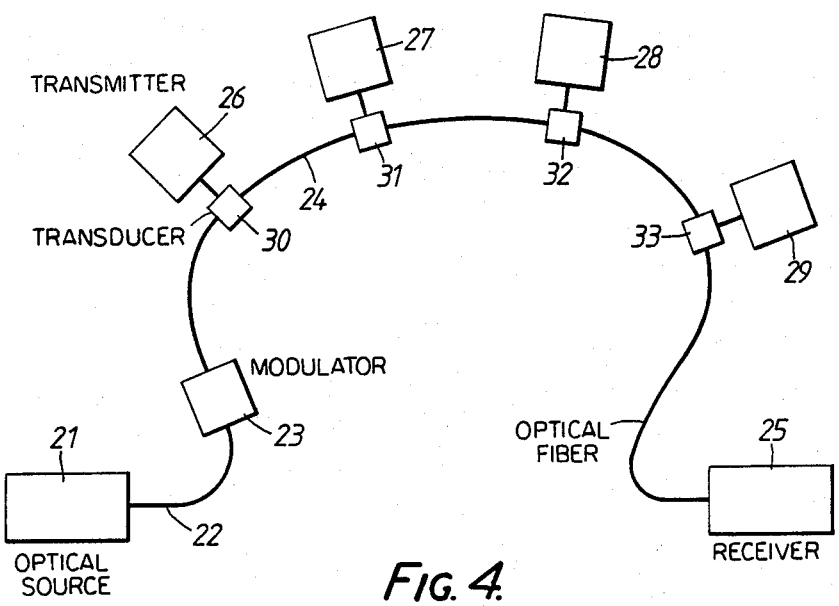
FIG. 4 shows a block schematic diagram of another optical transmission system according to the present invention; and, FIG. 5 is an explanatory diagram of the state of polarization modulator included in FIG. 4.

Referring now to FIG. 4 of the drawings this shows another embodiment of the invention using single transducers at the transmission points along the optical fibre.

The optical transmission system illustrated comprises an optical source 21 which produces plane polarized light which is arranged to be launched into an optical fibre 22 before being fed into a modulator 23 which continuously modulates the state of polarization of the plane polarized light produced by the optical source 21. The modulated plane polarized light is then launched into a continuous monomode transmission path optical fibre 24 which extends to a remote polarization analyser receiver 25. At different locations along the transmission path optical fibre 24 signal signal transmitters 26, 27, 28 and 29 produce modulated carrier signals at different carrier frequencies which are fed to appertaining electro-mechanical transducers 30, 31, 32 and 33. These transducers produce stressing of the transmission path optical fibre 24 in order to effect modulation of the continuously modulated light propagating along the optical fibre 24.

Figure 5:
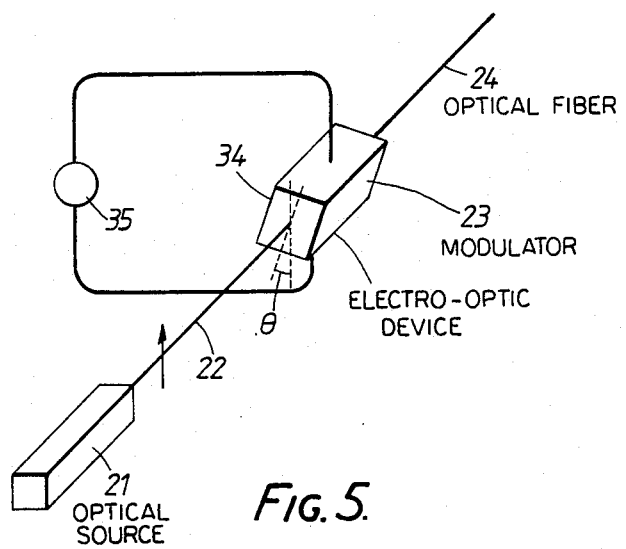

Referring now to FIG. 5 of the drawings, this shows an explanatory diagram of the modulator 23 in FIG. 4 and as can be seen the plane polarized light from the optical source 21 is modulated by an electro-optic device 34 having a modulating voltage 35 applied to it to produce a polarization modulation output. This provides direct polarization modulation but it may here be mentioned that modulation of the polarization state may also be achieved by injecting into the optical fibre 22 two light beams having optical frequencies separated by a difference frequency into different polarization states of the optical fibre 24.

By continuously modulating the polarization state of the light propagating along the optical fibre 24 the stresses imposed by the transducers 30 to 33 on the optical fibre can never be parallel or perpendicular to the plane of polarization of the propagating light for more than a very brief time period during each modulation cycle of the propagating light. Thus any significant failure of the modulated signals to modulate the plane polarized light is avoided whilst using only single transducers at the data transmission points thereby achieving very significant savings in cost especially where the number of data transmission points is relatively high whilst avoiding the previously-mentioned disadvantages of using pairs of transducers at the data transmission points arranged at appropriate angles in order to avoid the stressing being parallel or perpendicular to the planar polarization of the propagating light.

By way of explanation of the mode of operation of the system according to the present invention the following data is provided.

If the modulation frequency is FD and the signal carrier frequency is FS then the received signal will appear at FS and also at sidebands of the input frequency FD. The exact nature of the sidebands will depend on the manner in which the polarization state at the input is modulated. Typically, FD may be arranged to be larger than FS to prevent the sidebands from interfering with signals at FS. Appropriate choice of the polarization state analyser and demodulation techniques at the receiver will ensure that a signal can be received at all times with no possibility of fading.

We claim:

1. An optical fibre data transmission system in which appropriately modulated carrier data signals of different carrier frequencies are applied to transducers mechanically deforming a continuous length of monomode optical fibre at spaced data transmission points imparting thereto during a modulation cycle corresponding state of polarization modulation of plane-polarized light propagated along the optical fibre from a light source, the improvement residing in said light source including means for continuous modulation of state of polarization of the plane-polarized light before said propagation thereof along the optical fibre to the transmission data points at which the transducers receive the appropriately modulated carrier data signals, to maintain said state of polarization modulation during most of the modulation cycle and receiver means for receiving the plane-polarized light from the optical fibre, said receiving means including polarization analysis means for precisely determining the state of polarization of the light received and extracting therefrom modulation information imparted thereto through the transducers.

2. An optical fibre data transmission system as claimed in claim 1, in which the continuous modulation means comprises an electro-optic device having a modulating voltage applied thereto to produce a continuously modulated state of polarization output.

3. An optical fibre data transmission system as claimed in claim 1, in which the continuous means injects into the optical fibre two light beams having optical frequencies separated by a difference frequency into different polarization states of the optical fibre.

* * * * *